United States Patent
Wu et al.

(10) Patent No.: US 9,251,416 B2
(45) Date of Patent: Feb. 2, 2016

(54) TIME SCALE ADAPTIVE MOTION DETECTION

(71) Applicant: Xerox Corporation, Norwalk, CT (US)

(72) Inventors: Wencheng Wu, Webster, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 226 days.

(21) Appl. No.: 14/083,861

(22) Filed: Nov. 19, 2013

(65) Prior Publication Data

US 2015/0139484 A1    May 21, 2015

(51) Int. Cl.
*G06K 9/00* (2006.01)

(52) U.S. Cl.
CPC .................. *G06K 9/00624* (2013.01)

(58) Field of Classification Search
None
See application file for complete search history.

(56) References Cited

U.S. PATENT DOCUMENTS

| | | | |
|---|---|---|---|
| 5,606,376 A | 2/1997 | Shinohara | |
| 6,104,755 A | 8/2000 | Ohara | |
| 8,204,273 B2* | 6/2012 | Chambers | G08B 13/19613 382/103 |
| 8,300,890 B1* | 10/2012 | Gaikwad | H04N 5/144 382/103 |
| 8,948,453 B2* | 2/2015 | Zeng | H04N 5/23212 382/103 |
| 8,948,454 B2* | 2/2015 | Datta | G06K 9/6256 382/103 |
| 2006/0233448 A1* | 10/2006 | Pace | G06K 9/38 382/236 |
| 2009/0244309 A1* | 10/2009 | Maison | G06K 9/00369 348/222.1 |
| 2010/0290710 A1* | 11/2010 | Gagvani | G06T 7/2053 382/224 |
| 2011/0293190 A1 | 12/2011 | O'Callaghan | |

OTHER PUBLICATIONS

U.S. Appl. No. 13/922,091, filed Jun. 16, 2013, Bulan et al.
U.S. Appl. No. 13/963,200, filed Aug. 9, 2013, Pennington et al.
U.S. Appl. No. 14/017,360, filed Sep. 4, 2013, Bernal et al.
U.S. Appl. No. 14/033,059, filed Sep. 20, 2013, Wu et al.
Candamo, J. et al., "Understanding Transit Scenes: A Survey on Human Behavior-Recognition Algorithms," IEEE Transactions on Intelligent Transportation Systems (2010) 11(1):206-224.
Hu, F.Y. et al., "An Effective Detection Algorithm for Moving Object with Complex Background," Proceedings of the Fourth International Conference on Machine Learning and Cybernetics (2005) Guanzhou, Aug. 18-21, pp. 5011-5015.
Oliver, N. M. et al., "A Bayesian Computer Vision System for Modeling Human Interactions," IEEE Transactions on Pattern Analysis and Machine Intelligence (2000) 22(8):831-843.
Stauffer, C. et al. "Adaptive background mixture models for real-time tracking," Proc. IEEE Int. Conf. Comput. Vis. Pattern Recog. (1999) 2:246-252.

* cited by examiner

*Primary Examiner* — Nancy Bitar
(74) *Attorney, Agent, or Firm* — Kevin Soules; Kermit D. Lopez; Luis M. Ortiz

(57) ABSTRACT

A method and system for efficient non-persistent object motion detection comprises evaluating a video segment to identify at least two first pixel classes corresponding to a plurality of stationary pixels and a plurality of pixels in apparent motion, and evaluating the video segment to identify at least two second pixel classes corresponding to a background and a foreground indicative of the presence of a non-persistent object. The first pixel classes and the second pixel classes can be combined to define a final motion mask in the selected video segment indicative of the presence of a non-persistent object. An output can provide an indication that the object is in motion.

18 Claims, 9 Drawing Sheets

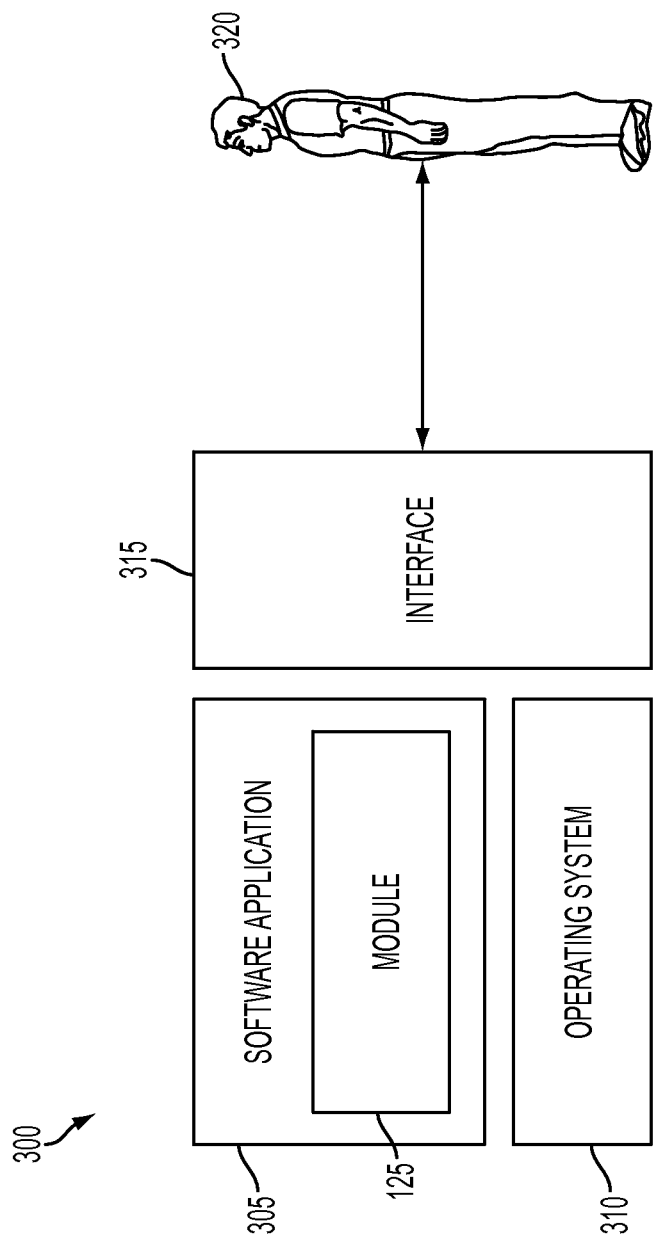

TIME SCALE ADAPTIVE MOTION DETECTION

FIELD OF THE INVENTION

Embodiments are generally related to the field of video-based motion detection. Embodiments are also related to video-based object tracking applications. Embodiments are further related to motion detection of objects in video-based tracking applications.

BACKGROUND

Motion detection is an important component of automated video analytics. Generally, it is a first step in initiating object tracking. However, current motion detection techniques are computationally expensive, particularly when applied to real-time applications. Such techniques require parameter fine-tuning to accommodate different patterns of motion, which can in turn, affect the robustness of the result.

This is particularly true in applications involving the stop-and-go flow of traffic where prior art techniques often fail when faced with objects of varying speed. For example, traffic scenarios where objects are moving through a scene at inconsistent or widely varying speeds, including some objects remaining stationary for varying periods of time, can result in the failure of traditional motion detection methods. This is because motion and foreground detection algorithms are typically tuned to support a limited range of speeds of objects moving through the scene.

Stationary objects can be another source of error in prior art techniques because they can be incorrectly categorized as part of the background of the scene. As such, a need exists for improved methods and systems for effective motion detection in video based tracking applications.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for video-based motion detection.

It is another aspect of the disclosed embodiments to provide a method and system for motion detection in video tracking applications.

It is yet another aspect of the disclosed embodiments to provide an enhanced method and system for robust and computationally efficient, time-scale-adaptive video-based motion detection of non-persistent objects in video tracking applications.

The aforementioned aspects and other objectives and advantages can now be achieved as described herein. Methods and systems are dislosed for efficient non-persistent object motion detection. A video segment can be evaluated to identify at least two first pixel classes wherein at least one of the first pixel classes corresponds to a plurality of stationary pixels and at least one of the first pixel classes corresponds to a plurality of pixels in apparent motion indicative of the presence of an object in motion, and evaluating the video segment to identify at least two second pixel classes wherein at least one of the second pixel classes corresponds to a background and at least one of the second pixel classes corresponds to a foreground indicative of the presence of a non-persistent object. The first pixel classes corresponding to a plurality of pixels in apparent motion and the second pixel classes corresponding to a foreground can be combined to define a final motion mask in the selected video segment indicative of the presence of a non-persistent object. An output can provide an indication that the object is in motion.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 3 depicts a computer software system for directing the operation of the data-processing system depicted in FIG. 1, in accordance with an example embodiment.

DETAILED DESCRIPTION

The particular values and configurations discussed in these non-limiting examples can be varied and are cited merely to illustrate at least one embodiment and are not intended to limit the scope thereof.

Figure 1:
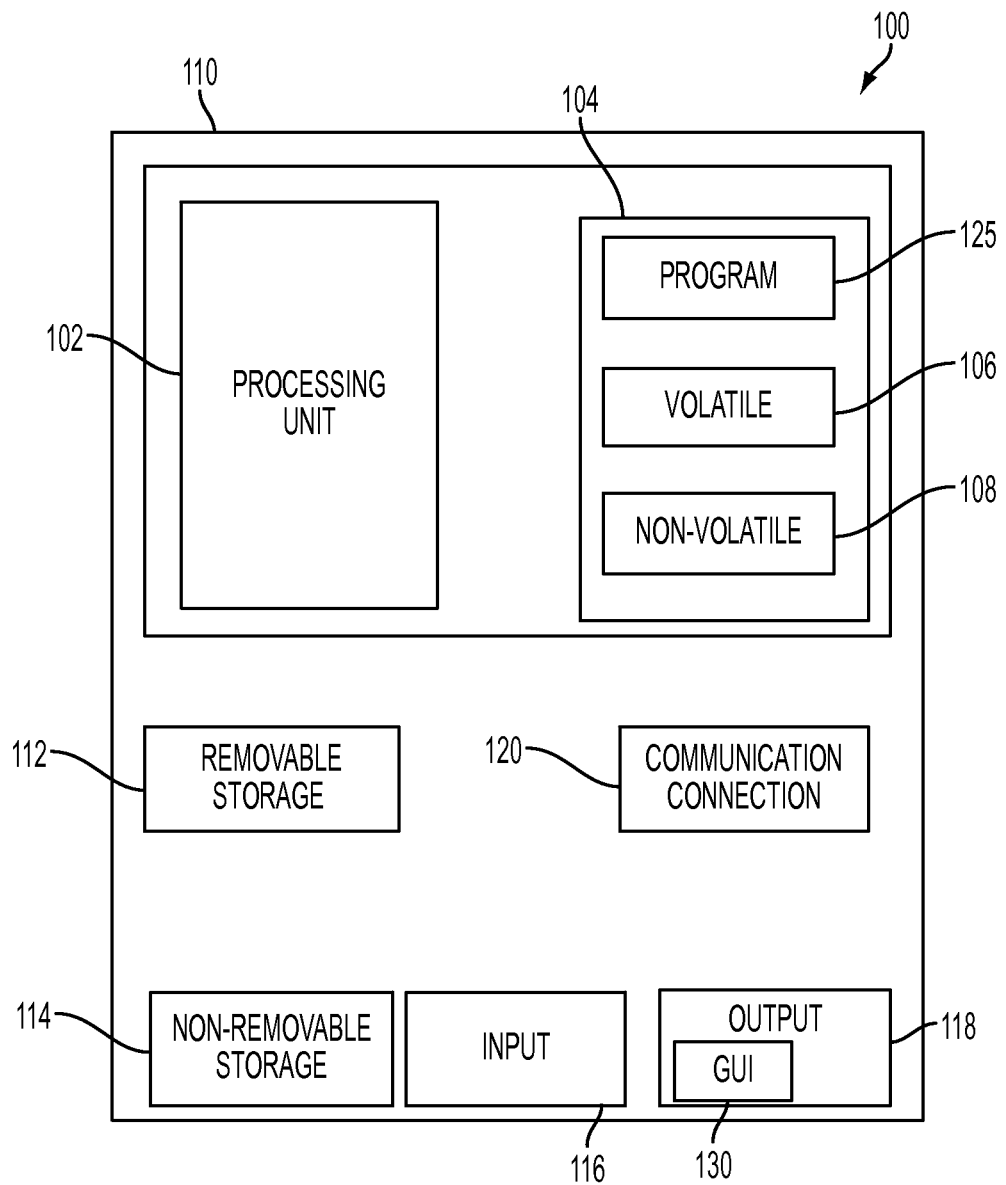
FIG. 1 depicts a block diagram of a computer system which is implemented in accordance with the disclosed embodiments.
Figure 2:
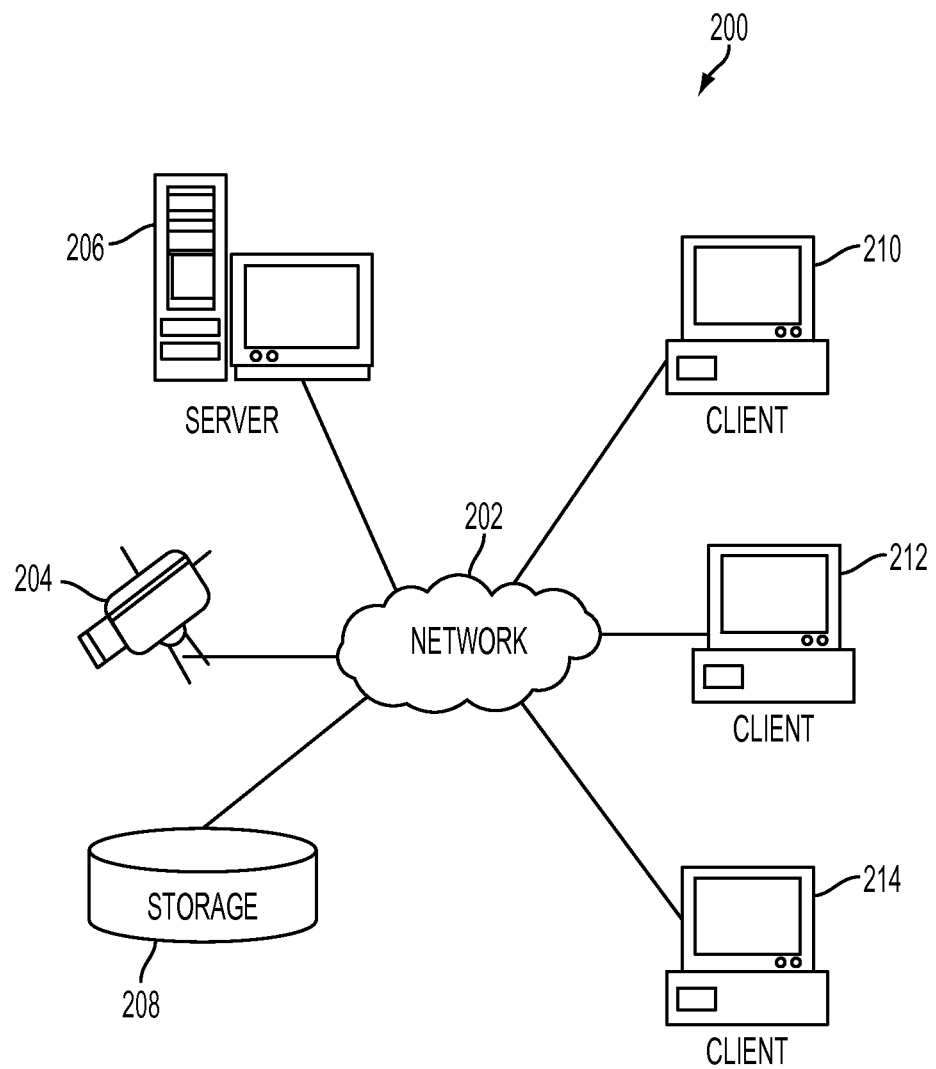
FIG. 2 depicts a graphical representation of a network of data-processing devices in which aspects of the present invention may be implemented.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1, in accordance with and example embodiment. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which an example embodiment can be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers such as a server 206, one or more external devices such as a video camera 204, and a memory storage unit such as, for example, a memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Motion detection is a crucial component in automated video analytics applications such as transportation, surveillance, etc. In most cases, motion detection is the first step in triggering tracking events. The present invention takes advantage of a combination of motion detection techniques, which provide a computationally efficient yet robust video-based motion detection method and system. Such methods and systems are particularly valuable in detecting motion of non-persistent objects. This includes situations where objects move through a scene at varying speeds, or where the flow of objects through the scene is otherwise irregular. These and other scenarios where movement flow is irregular include parking lots, stop-and-go traffic scenarios, entrances and exits to an environment, pedestrian traffic thoroughfares, toll booths, roads, highways, intersections, bridges, tunnels, and the like.

Figure 4A:
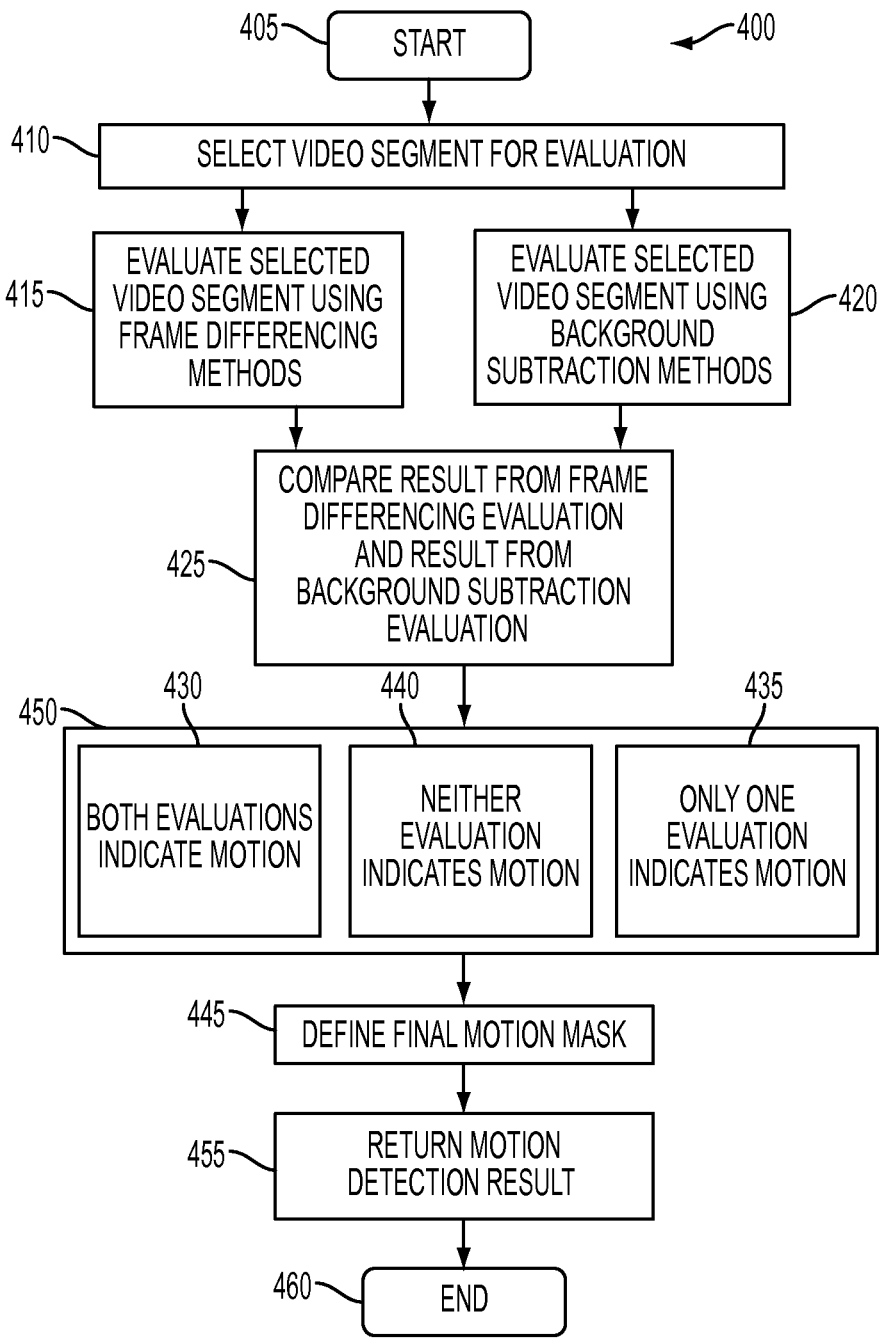
FIG. 4A depicts a high-level flow chart illustrating logical operational steps for detecting motion of non-persistent objects in accordance with the disclosed embodiments.

FIG. 4A illustrates a high level flow chart of operations depicting logical operations of a method 400 for efficient motion detection of non-persistent objects as described herein, and in accordance with an example embodiment. The method begins as indicated at step 405. As shown next, at step 410, a segment of video from a tracking system or other video collecting device can be selected. This video segment can be selected in real time as a video feed from a scene being surveilled by a video camera or other such tracking system. Alternatively, the video segment can be extracted from a previously stored video file.

As illustrated at step 415, the selected video can next be evaluated to identify a set of candidate "motion pixels" that are indicative of one or more objects in motion. This step can be accomplished using a frame differencing technique. Frame-differencing-based methods allow the time scale of motion through the scene to be roughly adjusted according to the temporal offset between the frames used to derive frame differences. For example, depending on the selected video, a frame differencing method can use consecutive video frames or frames selected at a predefined interval (e.g., every 10 frames). If the motion between temporally adjacent frames is significant, then the difference between frames that are relatively close together in time will provide robust motion detection. However, for motion that is smooth enough to be difficult to perceive across adjacent frames, the temporal offset between the frames should be selected accordingly to encompass wider temporal ranges.

The term "frame differencing" discussed above refers to the process of computing pixel-wise differences between two or more frames in the video sequence. In one embodiment, the frame differencing is done by calculating the absolute difference of pixel intensities of two selected frames. In another embodiment, the frame differencing is done by calculating the maximum of the absolute difference of pixel intensities among three selected frames. The latter is often referred to as double-frame-differencing. Use of frame differencing techniques involving larger numbers of frames is also possible.

In yet another example embodiment, the frame differencing can be accomplished by applying a block-based motion estimation method. According to this example embodiment, one of the frames is segmented into pixel blocks referred to as target blocks. An estimated or predicted frame is built by stitching together the blocks from the next frame that best matches the target blocks. Motion vectors can be utilized to describe the relative displacement between the location of the original blocks in the reference frames and their location in the predicted frame. When motion vectors are utilized for motion detection, there is no need to create a predicted frame. In another example embodiment, the frame differencing can be accomplished by applying optical-flow estimation methods between two selected frames.

"Optical flow" is defined as the pattern of apparent motion of objects, surfaces, and edges in a visual scene caused by the relative motion between the observer (e.g., a camera) and the scene. Optical flow may be used for motion detection purposes. In general, optical flow measures (or estimates) the velocity at which the optical intensity or brightness of an object (or of a pixel) flows through a scene. This can be characterized mathematically as follows.

Let $I(x,y,t)$ be the optical intensity of a point in a scene at position x,y at time t. Let $I(x+\Delta x, y+\Delta y, t+\Delta t)$ be the optical intensity of the same point at a different time $t+\Delta t$. The objective of optical flow estimation is to estimate the velocity of the point $$\left(\frac{\Delta x}{\Delta t}, \frac{\Delta y}{\Delta t}\right)$$

given two image frames $I(x,y,t)$ and $I(x,y,t+\Delta t)$ ∋ x,y ∈ Ω of a scene containing the point in motion. Further, let Ω represent the set of all positions in the scene. Optical flow estimation usually assumes that the intensity of all the objects/points of interest remain the same within the time period starting at t and ending at t+Δt. The objective is then to find (Δx,Δy) such that:

$$I(x,y,t) = I(x+\Delta x, y+\Delta y, t+\Delta t) \quad (1)$$

Note that in a video stream comprising a set of image frames, or a sequence of image frames, the I in the left-hand side of equation (1) is from one image frame, while the I in the right-hand side of equation (1) is from another image frame. This assumption is often referred as the brightness constancy constraint. By applying a Taylor series expansion on I(x+Δx, y+Δy,t+Δt) and using a first-order approximation, the above constraint can be simplified to:

$$\frac{\partial I}{\partial x}\frac{\Delta x}{\Delta t} + \frac{\partial I}{\partial y}\frac{\Delta y}{\Delta t} + \frac{\partial I}{\partial t}\frac{\Delta t}{\Delta t} = 0 \quad (2)$$

and re-written as $$I_x V_x + I_y V_y = -I_t \quad (3)$$

Here $I_x$, $I_y$, $I_t$ are the partial derivatives of I along x-, y- and t-axis, respectively. They are known variables that can be estimated directly from the two images in question. $V_x$, $V_y$ are the optical flow values along directions x and y, respectively. They are unknown variables that can be estimated using equation (3) which was derived by enforcing the brightness constancy constraint. Note that while there is only one equation derived from the brightness constancy constraint, there are two unknown values. Thus, the solution is non-unique. This is known as the aperture problem. In order to find a unique solution to equation (3) (i.e., unique values of the optical flow field), another set of equations is needed. Those equations can be derived by enforcing additional constraints. Most optical flow methods introduce additional conditions for estimating the actual flow. For example, in some cases it may be assumed that the optical flow within a small region (i.e., a region comprising a certain number of pixels) is constant. In other cases, it may be assumed that optical flow components within a small pixel patch can be approximated by a simple affine model. In using such a model, the optical flow of pixels within a small pixel patch are related by a constant scaling and offset, affine model. Thus, there are numerous ways given a pair of image frames, that one can estimate the optical flow using techniques known in the art. The resulting optical flow field is indicative of the apparent motion of objects, surfaces, and edges in the visual scene as a result of the relative motion between the observer (e.g., a camera) and the scene.

With this in mind, optical flow methods can be used for motion detection by first computing the optical flow field components for all pixels and then applying a thresholding operation with a pre-determined threshold (i.e., a motion pixel is detected if the magnitude of its corresponding optical flow vector exceeds some threshold values). It should be appreciated that thresholding operations may optionally be applied to the outputs of any of the above-mentioned frame differencing methods in order to convert the result into a binary representation such as a mask that indicates the location of motion and non-motion pixels.

This highlights that the described frame differencing method for motion detection can be very finely tuned to a narrow range of speeds of motion, according to the choice of temporal offset between frames used for frame differencing, the frame rate, and camera geometry. However, for patterns of motion with speeds outside that range, motion detection via frame differencing may not be sufficient.

Therefore, as indicated at step 420, the selected video segment can also be evaluated by identifying at least two pixel classes. The first pixel class corresponds to at least one foreground image or object, and the second class of pixels corresponds to the background of the video segment. Those skilled in the art will appreciate that this is essentially a foreground detection method based on background estimation and subtraction.

For the background estimation and subtraction method shown at step 420, adjustment of the time scale is much more flexible than that of step 415. At step 420, adjusting the time scale is achieved by dynamically adjusting parameters in the background modeling. Background estimation and subtraction will output a signal based on foreground detection regardless of whether motion is present or not. Consequently, background estimation and subtraction alone is often not sufficient for robust motion detection.

Background estimation and subtraction is a technique for foreground object detection within a scene. It involves subtracting or comparing a current frame with a background estimate and thresholding the resulting difference image. A background estimate can comprise an image obtained, for example, by performing a pixel-wise running or weighted average or pixel-wise median computation of incoming video frames.

Alternatively, a background estimate can comprise a set of pixel-wise statistical models describing the historical behavior of pixel values. When subtracting a current frame from a background estimate, pixels that are above a pre-determined threshold are deemed to belong to the foreground. When comparing a current frame with a background estimate, pixels that are deemed not to fit their corresponding statistical model are deemed to belong to the foreground. In order to minimize the effects of noise and like-colors in background and foreground areas, morphological operations such as erosion, dilation, and hole filling can be applied on the resulting binary image. Background estimates can be obtained in multiple ways.

There are independent computational, performance, and robustness advantages to both steps 415 and 420. The best results however, can be obtained by integrating or fusing the results from both steps.

It is important to note that steps 415 and 420 in FIG. 4A are illustrated as being conducted roughly in parallel temporally. However, in an alternative embodiment steps 415 and 420 can also be executed in serial; that is step 415 can be executed and then step 420 can be executed. Furthermore, it is acceptable to execute either step 415 or 420 first depending on the specific nature of the tracking application.

At step 425, the results from the frame differencing procedure of step 415 and the background estimation and subtraction procedure of step 420 can be compared and fused.

In one example embodiment, a final motion mask is defined or determined at step 445 by the following fusion method 450, which includes steps 430, 435, and 440. For each pixel in the current frame, if both frame differencing at step 415 and background estimation and subtraction at step 420 indicate the pixel is representative of an object in motion in the video segment, as shown at step 430, then the value of the motion mask at this pixel location is set to 1, indicating that motion of a non-persistent objects has been detected at that pixel location. If neither evaluation indicates an object in motion, as shown at step 440, the motion mask of the pixel is set to 0, indicating that no motion has been detected at that pixel location. If only one of the evaluations indicates the presence of an object in motion for a given pixel, as shown at step 435, the value of the motion mask at this pixel location is set to 0, indicating that no motion has been detected at that pixel location.

This process is iteratively repeated for all pixel locations in the current frame, until a final motion mask is defined as illustrated by step 445. Thus, the fusion procedure 450 performs a pixel-wise logical AND-operation to combine the results from frame-differencing methods step 415 and background estimation and subtraction methods step 420. This fusion method is stricter than either step 415 or 420 alone, due to the operation of step 435 and is especially useful to remove duplicate detections or duplicate trackers triggered by motion detection algorithms, particularly in scenarios which present repeated stop-and-go motion patterns.

In an alternate embodiment, it may sometimes be preferable to error on the side of triggering multiple detections per object as opposed to missing object detections or missing the triggering of trackers. This preference can be realized by setting the value to 1 rather than 0 in step 435, where only one evaluation is indicative of motion. This is equivalent to performing a pixel-wise logical OR-operation to combine the results from step 415 and 420.

It should be understood that the class of fusion methods discussed in this embodiment operate on the binary results provided by steps 415 and 420. In this case, the optional step of thresholding discussed earlier is required to achieve binary intermediate results. In alternative embodiments the described fusion method 400 can be applied to non-binary results provided by steps 415 and 420.

For example, in one alternative embodiment, a final motion mask is defined or determined at step 445 by a fusion method 450, which is applied directly to the non-binary results obtained before thresholding.

In this embodiment, the resulting motion mask from the frame differencing at step 415 can comprise a continuous-valued (non-binary) image wherein each pixel value is proportional to the magnitude of its corresponding frame-to-frame difference value. Similarly, the resulting foreground mask from background estimation and subtraction at step 420 can comprise a continuous-valued image wherein each pixel value is inversely proportional to the confidence that the pixel belongs to its corresponding distribution. The final motion mask defined at step 445 can, in turn, be a continuous-valued image wherein each pixel value is a function of a mathematical combination of the values in the motion and the foreground mask. Examples of combinations include averages, weighted averages, products, order statistics such as median, min, max, percentile etc., and, in general, any analytical function containing terms related to the values in each of the masks. If so desired, the resulting continuous-valued final motion mask can be further thresholded to obtain a binary final motion mask.

According to this embodiment, for each pixel in the current frame, the motion mask of this pixel is set to 1 at step 430, if the resulting continuous-valued final motion mask exceeds a threshold. Otherwise, the motion mask of this pixel is set to 0. The advantage of this fusion method over the binary version discussed above is that the magnitude of the differences in step 415 and 420, which are indicative of the confidence whether a motion exist, are directly incorporated into the fusion decision. However, the computation and memory storage required is higher. Both classes of fusion methods discussed so far are performed at a pixel level. At step 455, a motion detection result is returned before the method ends at 460.

Figure 4B:
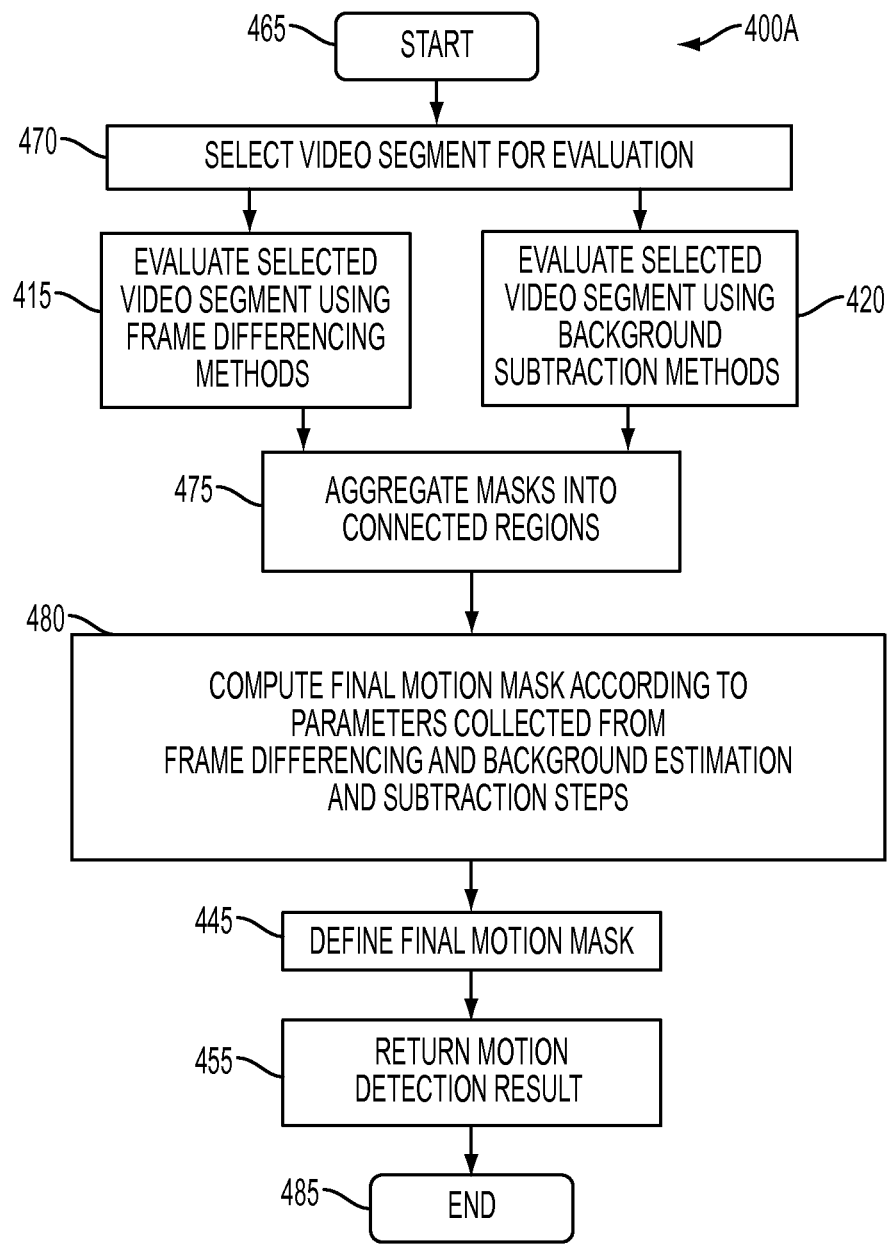
FIG. 4B depicts a high-level flow chart illustrating alternative logical operational steps for detecting motion of non-persistent objects in accordance with the disclosed embodiments.

In another embodiment, illustrated in FIG. 4B fusion methods are applied at a region level. Steps in method 400A that are equivalent to those of method 400 are labeled with equivalent reference numerals. This method begins at step 465 and a video segment is selected at step 470.

According to this embodiment, a region, or set of region, can be defined as a group of pixels, determined, for example, via connected component analysis, as shown at step 475. A final motion mask is then defined or determined at step 445 by fusion method 480 which performs fusion at a region level.

For example, the binary results of step 415 and 420 can be aggregated into connected regions indicative of the location, size and shape of the potential moving non-persistent objects via, for example, connected component analysis, and, optionally, other additional morphological filtering on the binary mask as shown at step 475. The final motion mask defined at step 445 is computed based on at least one of the absolute size, fractional size, and shape of the overlapping regions between masks 415 and 420. A motion detection result is then returned at step 455 and the method ends at 485.

Alternatively, the region-based fusion can also be performed from non-binary, continuous-valued masks, in which case, the fusion is performed based on the region-wise confidence values (evaluated at a region level rather than pixel level) of regions in step 415 and 420. It should be appreciated that both classes of fusion methods discussed with respect to FIG. 4A, for pixel-level operation can be extended to region-level operation as shown in FIG. 4B.

Figure 5:
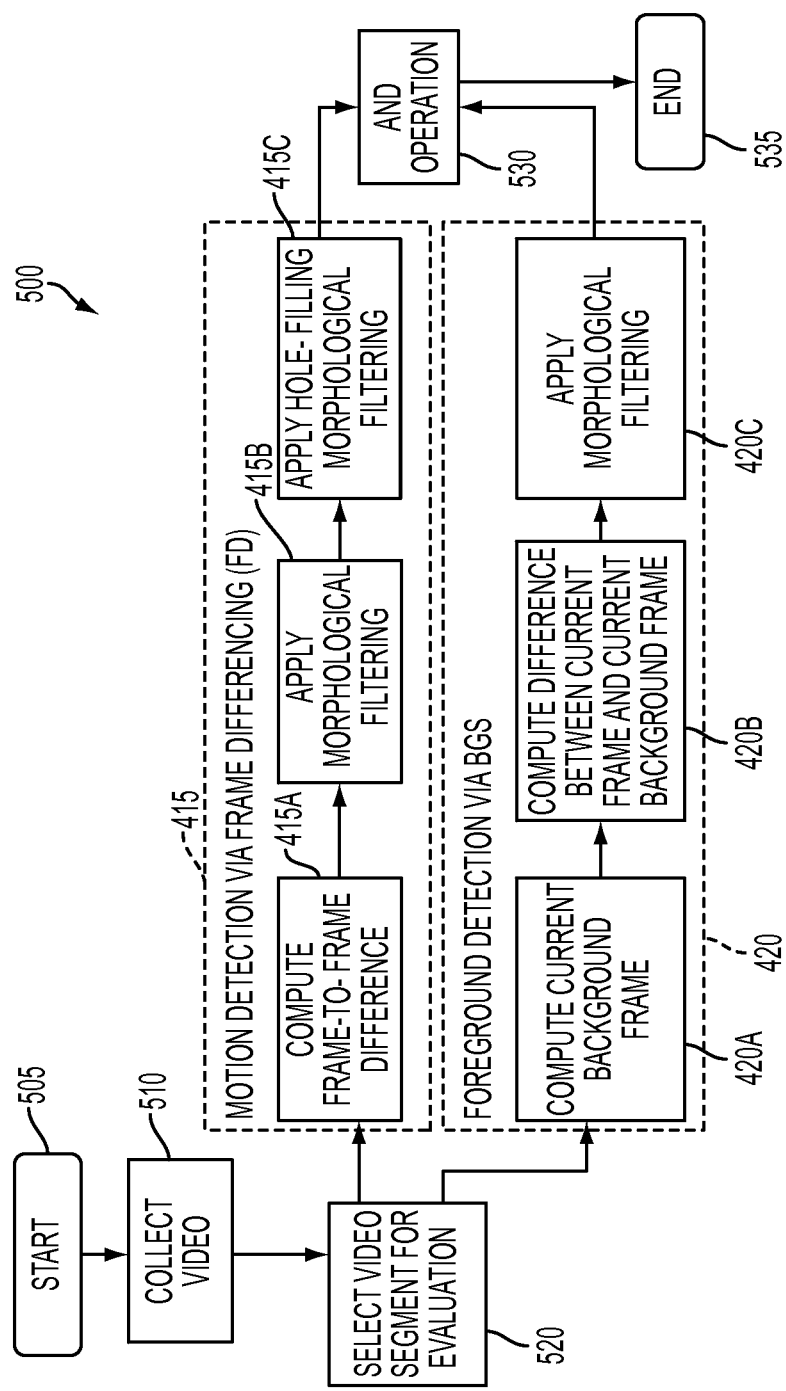
FIG. 5 depicts a flow chart illustrating logical operational steps for detecting motion of non-persistent objects in accordance with an alternative disclosed embodiment.

FIG. 5 illustrates a flow chart 500 of logical operational steps associated with non-persistent object motion detection in accordance with an alternative embodiment. The method starts at step 505.

The first step is to collect video of the scene of interest as shown at step 510. Generally, video of the scene is captured by a surveillance camera. A scene of interest may be a road, highway, bridge, tunnel, traffic intersection, parking garage, pedestrian thoroughfare, train track, train station, or the like. It should be appreciated that the claimed methods and systems could be advantageously implemented in other surveillance and tracking applications and that the list provided above is exemplary and not intended to limit the scope of the invention.

Next at step 520, a segment of the video is selected for evaluation. The next step is functionally equivalent to step 415 of FIG. 4A. A frame differencing technique is used to identify at least one set of pixels indicative of at least one object in motion in the selected video segment. This step can include a number of sub-steps.

For example, step 415A shows the first sub-step where a frame to frame difference is computed. Frame differencing does not require a background estimate. Accordingly, frame differencing does not detect foreground objects but rather moving objects. In frame differencing, a difference, or set of differences, between temporally adjacent frames is computed and then thresholded. The absolute magnitude of the computed difference yields a set of candidate "motion pixels" indicative of an object in motion. In one embodiment, double frame differences can be applied to consecutive frames. The choice of consecutive frames enables motion detection at the shortest time scale that the video frame rate allows. The use of double frame differences is more robust against motion noise due to abrupt changes in scene appearance such as camera shake when compared to a single frame differencing method.

Frame differencing at step 415 is computationally efficient, requires a relatively small amount of memory, and is therefore amenable to real-time implementation. Furthermore, it is good for detecting abrupt changes. However, frame differencing is also sensitive to motion noises, does not detect changes related to slow motion robustly, and may have holes in the detected motion blobs (i.e., "motion pixels") because it fundamentally detects edges in motion and associated textures, not constant color areas.

At step 415B, a morphologic filtering technique is applied to refine the candidate motion pixels (or motion blobs) identified in step 415A. The result of this morphological filtering process is one or more refined sets of motion pixels or motion blobs. The morphological filtering removes spurious sources of motion and noise. In one embodiment, the morphological filtering includes a combination of morphological opening and/or closing operations with pre-defined structuring elements, which specify the shape and extent of the morphological operations.

Morphological hole filling is then applied to the refined motion detection results (i.e., the refined sets of motion pixels produced in step 415B) at step 415C. Morphological hole filling is applied to fill in holes in the pixel blobs that commonly occur when frame differencing is used. This is followed by a second thresholding operation based on the size (or number of connected motion pixels) for each refined and filled motion blob and yields at least one corrected set of motion pixels or a motion binary mask. Additionally and alternatively, other morphological operations may be applied including dilations, erosions, and convex hull computation.

Step 420 also involves a set of sub-steps necessary for foreground detection via background estimation and subtraction. Background estimation and subtraction is a technique for foreground object detection within a scene. It involves subtracting or comparing a current frame with a background estimate and thresholding the resulting difference image. A background estimate can comprise an image obtained, for example, by performing a pixel-wise running or weighted average or pixel-wise median computation of incoming video frames. Alternatively, a background estimate can comprise a set of pixel-wise statistical models describing the historical behavior of pixel values. When subtracting a current frame from a background estimate, pixels that are above a pre-determined threshold are deemed to belong to the foreground. When comparing a current frame with a background estimate, pixels that are deemed not to fit their corresponding statistical model are deemed to belong to the foreground. In order to minimize the effects of noise and like-colors in background and foreground areas, morphological operations such as erosion, dilation, and hole filling can be applied on the resulting binary image. Background estimates can be obtained in multiple ways.

At step 420A the background frame is efficiently computed. This can be accomplished, for example, by using a weighted sum of ($\alpha$) previous background frames and ($1-\alpha$) for the current frame. Alternatively, an average of the last N frames can be used to find a running average, which requires an efficient running sum approach for calculating the running average. The lower bound of the appropriate time scale for this step can be adjusted by manipulating the values of $\alpha$ of N, respectively. The weighted sum approach has the advantage that the impact of each new frame on the background frame is reduced gradually as time progresses. The running average approach holds the contribution of a given frame to the background at approximately $1/N$ for N frames and then drops immediately to zero thereafter.

Alternative approaches to background estimation and subtraction include building a mixture of Gaussians for each pixel or pixel block which describes the historical statistical behavior of the color characteristics of the pixel or pixel blocks. If the current pixel value adheres to that historical behavior, it is considered to be a background pixel; otherwise, it is considered a foreground pixel. Other background estimates such as eigen-backgrounds or static images of an empty scene can alternatively be used as background estimates. It should be noted that there are many other approaches to background estimation and subtraction that may alternatively be used in step 415A, and that the above examples are provided as exemplary embodiments of the invention.

Next, the difference, or a comparison between the current frame and current background frame, is computed. This produces sets of pixel classes that correspond to foreground pixels in the selected video segment as illustrated in step 420B. This step is not unlike that of step 415a except that in this case the difference or the comparison is calculated between the current frame and background frame or estimate rather than between consecutive frames. Because there is an effective time scale in this calculation, this step can be modified to detect motion at various time scales of interest by adjusting the parameters a or N used in constructing the background estimate. Thus, the main advantage of background estimation and subtraction as shown in step 420 is the adaptability to a time scale of interest. However, building background models requires convergence time (perhaps 100 frames or more) and works better with smooth parameter updates. Therefore, unlike frame differencing, background estimation and subtraction is not well-suited for dealing with abrupt changes which may be caused by sudden illumination variations or fast paced motion relative to the time scale selected.

Step 420C describes applying morphological filtering to the foreground pixel classes defined by step 420B. Once again, the morphological filtering is applied to remove spurious sources of motion and noise. This may further include size thresholding for each of the sets (classes) of foreground pixels. The steps above ultimately result in a foreground binary mask.

At step 530, a final motion mask is identified by performing a pixel wise binary logical "AND" operation between the motion binary mask provided at step 415C and the foreground binary mask provided at step 420C. The binary "AND" operation generally includes two inputs and one output. Both respective inputs to the AND operation can be only a positive or negative. This is generally represented as 1 (positive) and 0 (negative). Any combination of inputs that are not all 1 (positive) will result in an output of 0 (negative). The output will only result in a 1 (positive) where all the inputs are also 1 (positive).

The pixel-wise application of the AND operation works as follows. For each pixel in the motion binary mask and for each pixel in the foreground binary mask, a pixel wise comparison is computed by checking if the corresponding pixel location in both respective masks returns a positive (i.e., a motion pixel is detected). If both return positive the output of the AND operation is positive and the Final motion mask includes a positive pixel at that location. If either of the respective masks return a negative (i.e., a motion pixel is not detected), the output of the AND operation is negative and the Final motion mask does not include a positive pixel at that location. The method ends at block 535.

The combination of the two classes of motion detection using the pixel-wise binary AND operation overcomes the shortcomings that result from the independent use of frame differencing or background estimation and subtraction.

For example, in the case of a continuously moving object, both frame differencing and background estimation and subtraction will detect motion. The AND operation serves as confirmation of the outputs of the two methods. It may be advantageous to set lower thresholds for the frame differencing approach since it will still have tendency to have holes in its detected motion blobs otherwise. By doing so, the resulting motion blobs would mainly be determined by the background estimation and subtraction module. The time scale is determined by the background estimation and subtraction parameters such as α or N.

In the case where a moving object is coming to a stop, background estimation and subtraction will require time for the moving object to merge into the background estimate. Thus, the motion blob may still be detected by background estimation and subtraction method for a period of time after the object has stopped. However, using frame differencing, once the object stops there is no lag in detection. Thus, the AND operation would be advantageously affected by the frame differencing output and stop detecting motion blobs as soon as the moving object stops.

In the case of a stopped object that starts to move again (such as a car pulling out of a parking spot), when the object initially moves out of its original static position, both frame differencing and background estimation and subtraction will immediately detect motion. However, while the object is moving out of its original static position, if the background scene associated with the original static position has not yet been assimilated into the background model necessary for background estimation and subtraction, then the foreground blob would either be bigger than the actual vehicle blob (for example, when the vehicle is still partly in the stall, the blob will be the vehicle plus the stall) or worse, become two blobs (when the vehicle is completely out of the stall, two blobs will form, one for the actual vehicle and another for the stall due to the ghost image of the vehicle). By contrast, frame differencing has no "memory" beyond the temporal scope across which the differencing occurs. Thus, applying the AND operation to the outputs from both the frame differencing 415 and background estimation and subtraction 420 will properly size the blob or remove the additional blob. This approach results in a key improvement for real-time systems where object tracking is simply performed based on the proximity of the detected blobs instead of using computationally expensive feature extraction and matching.

Note that in alternative embodiments of the method, other methods of combining the classes of motion are possible. For example, in a non-binary embodiment, the motion mask can comprise a continuous-valued image wherein each pixel value is proportional to the magnitude of its corresponding frame-to-frame difference value. Similarly, the foreground mask can comprise a continuous-valued image wherein each pixel value is inversely proportional to the confidence that the pixel belongs to its corresponding distribution. The final motion mask can, in turn, be a continuous-valued image wherein each pixel value is a function of a mathematical combination of the values in the motion and the foreground mask. Examples of combinations include averages, weighted averages, products, order statistics such as median, min, max, percentile etc., and, in general, any analytical function containing terms related to the values in each of the masks. If so desired, the resulting continuous-valued final motion mask can be thresholded to obtain a binary final motion mask. Note that other approaches that combine the different classes of masks based on region-level computations are also possible, as discussed above.

Figure 6:
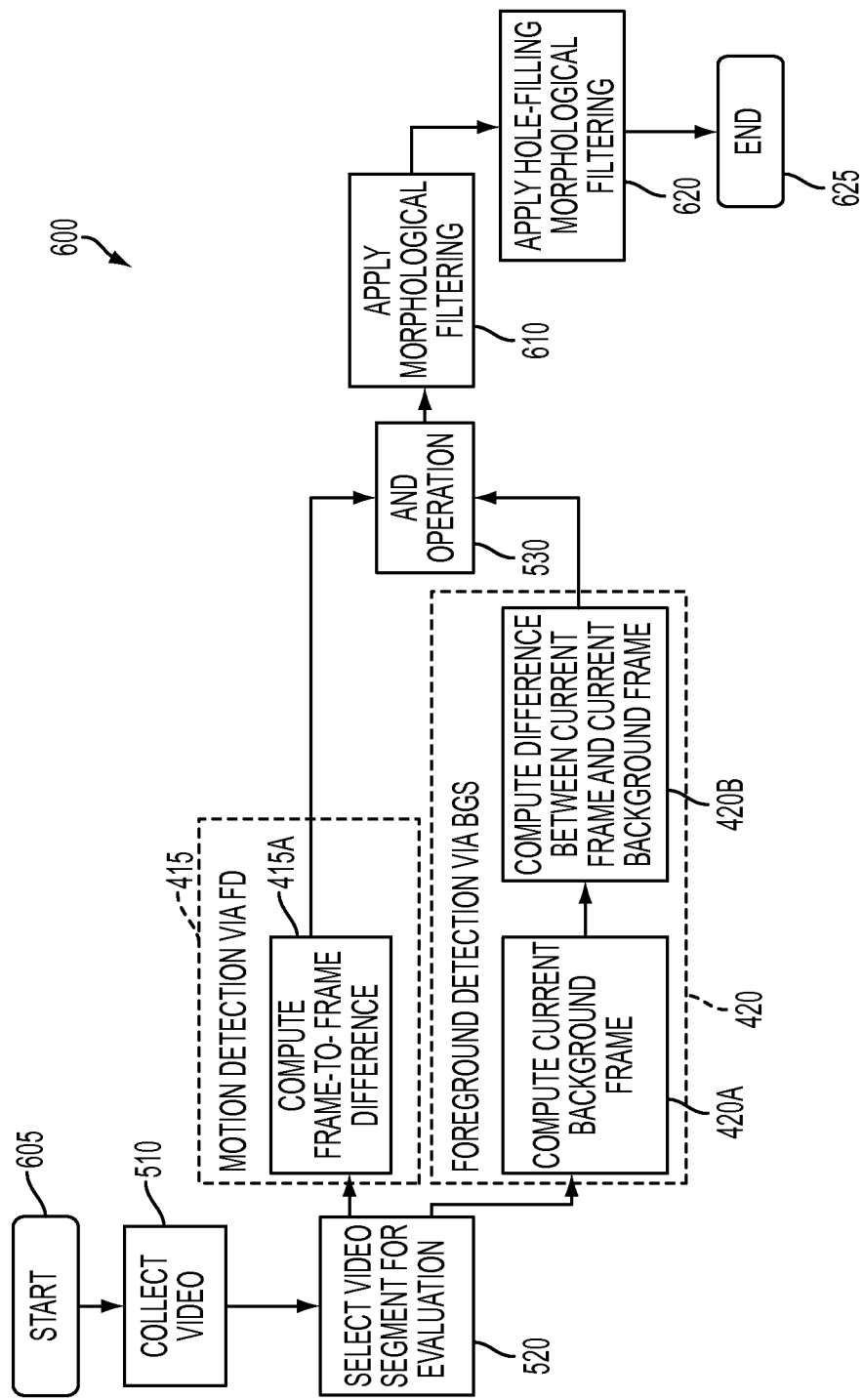
FIG. 6 depicts a flow chart illustrating logical operational steps for detecting motion of non-persistent objects in accordance with an alternative disclosed embodiment.

FIG. 6 illustrates an alternative flow chart 600 of logical operational steps associated with non-persistent object motion detection in accordance with an alternative embodiment. The method starts at step 605.

As in method 500, video of the scene is collected at step 510 and a segment of the video is selected for evaluation at step 520. However, in this alternative embodiment, the motion detection of step 415 includes only step 415A wherein a frame-to-frame difference of the selected video segment is computed. Likewise, in this alternative embodiment, the foreground detection of step 420 includes computing the background frame at 420A and computing the difference between the current frame and background frame at 420B.

Next at step 530, the same pixel-wise binary AND operation is performed on the respective outputs provided at steps 415A and 420B. As illustrated by step 610, the final motion mask output from the AND operation then undergoes morphological filtering and hole filling at step 620. The method ends at step 625.

Figure 7:
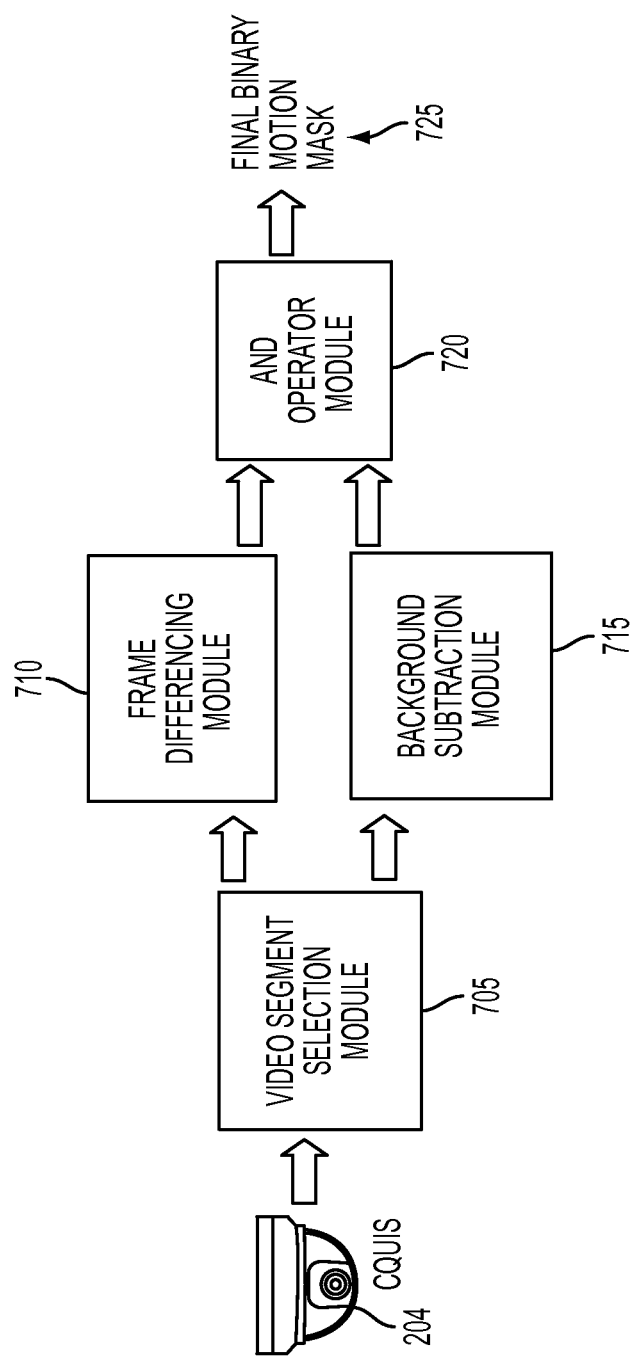
FIG. 7 depicts a block diagram of modules associated with a system and method for detecting motion of non-persistent objects in accordance with disclosed embodiments.

FIG. 7 illustrates a block diagram of modules associated with a non-persistent object tracking method and system. These modules may comprise hardware and/or software associated with a computer system such as computer system 100 and can be implemented using both the computer system 100 and/or the network 200. A video acquisition module 204 is used to monitor a scene of interest. Video acquisition module 204 can be any type of video or other such surveillance device. Alternatively, video acquisition module 204 can comprise previously captured video stored as data in memory such as memory 104, removable storage 112, or non-removable storage 114.

Video acquisition module 204 provides data to video segment selection module 705. Video segment selection module 705 is used to select a segment of video data to evaluate for motion detection. The selected segments of video data are then provided to frame differencing module 710 and background estimation and subtraction module 715. Frame differencing module 710 is configured to implement the procedure of method step 415 including steps 415A-C. Likewise, background estimation and subtraction module 715 is configured to implement method step 420 including steps 420A-C.

The output from frame differencing module 710 and the output from background estimation and subtraction module estimation 715 are provided to AND operator module 720, which performs a pixel wise binary AND operation on the input data and returns a final motion binary mask indicative of an object in motion.

Figure 8:
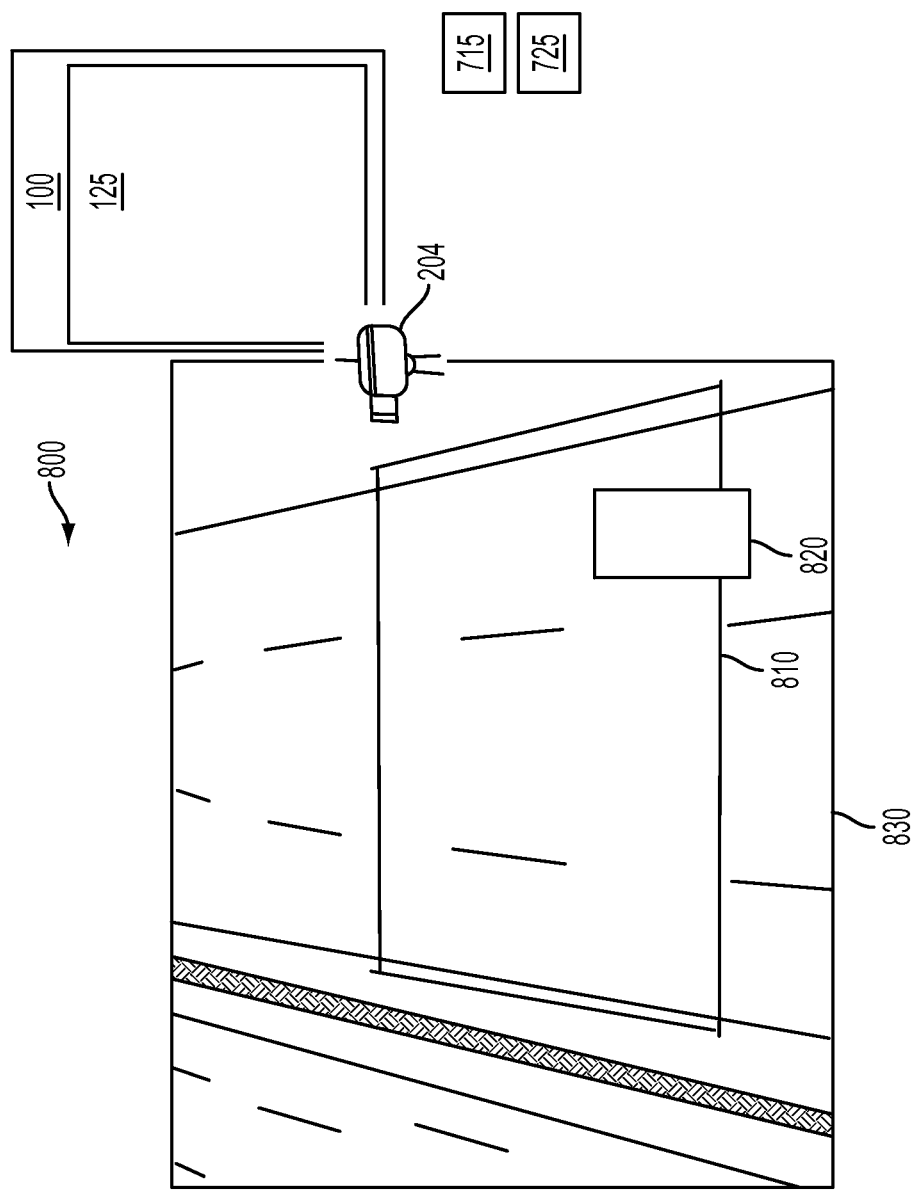
FIG. 8 depicts a system for detecting motion of non-persistent objects in accordance with the disclosed embodiments.

FIG. 8 illustrates a system 800 for non-persistent motion detection. In one embodiment, the system is deployed in an environment 830 such as along a street, as shown in FIG. 8. The environment 830 may also be any other environment where video surveillance is preformed and preferably in an environment characterized by motion of non-persistent objects such as in stop and go traffic conditions or a parking lot. The example of a street shown in FIG. 8 is provided solely as an example and not intended to limit the scope of the application.

Within environment 830, a vehicle 820 may be present on a roadway, in an intersection, in a parking facility, or any other such environment. The vehicle 820 travels through environment 830 at varying rates of speed due to traffic congestion, stoplights or other such obstructions. As the vehicle 820 enters area of interest 810, video acquisition module 204, herein shown as a video camera, collects video data of the area of interest 810. It should be appreciated that the video data of the area of interest 810 may be continuously collected, or alternatively, video acquisition may be triggered when a vehicle enters the area of interest 810. Furthermore, video acquisition module 204 may save video data in a database and associated data structure such as a database stored in memory 104 of computer system 100.

Video camera 204 may be operably connected with a computer system 100 and/or network 200 as illustrated in FIGS. 1 and 2. In FIG. 8, computer system 100 is shown with a number of associated modules used to implement the processing steps and/or modules shown in FIGS. 3 and 7.

As vehicle 820 enters the area of interest 810, video camera 204 collects video data of the vehicle 820 and transmits that data to computer system 100 and to video segment selection module 705. In video segment selection module 705, a segment of the video is selected for evaluation. That segment of video data is provided to frame differencing module 710 and background estimation and subtraction module 715. These modules advantageously use a frame differencing technique and background estimation and subtraction to produce a motion binary mask and a foreground binary mask.

Next, the output from frame differencing module 710 and background estimation and subtraction module 715 are provided to AND operator module 720. AND operator module 720 applies a pixel-wise binary AND operation on the respective inputs and returns a final binary mask indicative of non-persistent motion.

Based on the foregoing, it can be appreciated that a number of embodiments, preferred and alternative, are disclosed herein. For example, in one embodiment, a method for efficient motion detection of non-persistent objects comprises selecting a video segment for evaluation. The video segment is then evaluated to identify at least two first pixel classes wherein at least one of the first pixel classes corresponds to a plurality of stationary pixels and at least one of the first pixel classes corresponds to a plurality of pixels in apparent motion that are indicative of the presence of a non-persistent object in motion. In addition, the video segment is evaluated to identify at least two second pixel classes wherein at least one of the second pixel classes corresponds to a background and at least one of the second pixel classes corresponds to a foreground indicative of the presence of a non-persistent object. The method includes combining the at least one of the first pixel classes corresponding to a plurality of pixels in apparent motion, and the at least one of the second pixel classes corresponding to a foreground, thereby defining a final motion mask in the selected video segment indicative of the presence of a non-persistent object and providing an output indicating an object in motion.

The method of evaluating the video segment to identify at least two first pixel classes wherein at least one of the first pixel classes corresponds to a plurality of stationary pixels and at least one of the first pixel classes corresponds to a plurality of pixels in apparent motion indicative of the presence of an object in motion further comprises identifying a plurality of candidate motion pixels corresponding to a plurality of pixels in apparent motion indicative of the presence of a non-persistent object in motion and applying morphological filtering to the candidate motion pixels thereby providing a motion mask.

In another embodiment of the method, identifying a plurality of candidate motion pixels corresponding to a plurality of pixels in apparent motion indicative of the presence of an object in motion comprises at least one of computing a frame-to-frame difference, computing a double frame-to-frame difference, computing a multiple frame-to-frame difference, computing an optical flow, and computing a block based motion estimation.

In another embodiment, the method of applying morphological filtering to the candidate motion pixels further comprises defining a refined set of motion pixels indicative of the presence of a non-persistent object in motion and applying morphological hole filling on the refined set of motion pixels thereby providing a motion binary mask.

The method of evaluating the video segment to identify at least two second pixel classes wherein at least one of the second pixel classes corresponds to a background and at least one of the second pixel classes corresponds to a foreground indicative of the presence of a non-persistent object further comprises identifying a current frame of the selected video segment and identifying a current background frame of the selected video segment, comparing the current background frame of the selected video segment and the identified current frame of the video segment to identify a foreground of the current frame, and producing a foreground mask.

In another embodiment, the method of identifying a current background frame of the selected video segment comprises one of estimating a current background frame of the video segment wherein estimating a current background frame comprises at least one of performing a pixel-wise running average on a plurality of incoming frames, performing a pixel-wise weighted average on a plurality of incoming frames, and performing a pixel-wise median computation on a plurality of incoming frames; and computing a set of pixel-wise statistical models corresponding to the current background frame. Producing a foreground binary mask further comprises applying morphological filtering on the identified foreground of the current frame and comparing a size of the identified foreground of the current frame against a threshold size, wherein if the size of the identified foreground of the current frame is greater than the threshold size, the foreground of the current frame provides a foreground binary mask.

In another embodiment of the method, the first pixel class corresponds to a plurality of pixels in apparent motion comprises one of a motion binary mask and a motion non-binary mask, and wherein the second pixel class corresponding to a foreground indicative of the presence of a non-persistent object comprises one of a foreground binary mask and a foreground non-binary mask. In addition, the method of combining the set of motion pixels indicative of the presence of an object in motion and the at least one of the pixel classes corresponding to a foreground of the selected video segment thereby defining a final motion mask in the selected video segment indicative of the presence of a non-persistent object further comprises one of applying a binary, pixel-wise AND operation on the motion binary mask and said foreground binary mask, or applying a binary, pixel-wise OR operation on the motion binary mask and the foreground binary mask.

In an alternative embodiment, the method of combining the at least one of the first pixel classes corresponding to a plurality of pixels in apparent motion, and the at least one of the second pixel classes corresponding to a foreground of the selected video segment thereby defining a final motion mask in the selected video segment indicative of the presence of a non-persistent object further comprises applying a pixel-wise operation on the motion non-binary mask and the foreground non-binary mask comprising at least one of averaging a continuous-value associated with the motion non-binary mask and a continuous-value associated with the foreground binary mask, computing a weighted average of a continuous-value associated with the motion non-binary mask and a continuous-value associated with the foreground binary mask, computing a product of a continuous-value associated with the motion non-binary mask and a continuous-value associated with the foreground binary mask, and conducting an order-statistical combination of a continuous-value associated with the motion non-binary mask and a continuous-value associated with the foreground binary mask, and thresholding a resulting mask from the pixel-wise operation to yield the final motion mask.

In another alternative embodiment, the method of combining the at least one of the first pixel classes corresponding to a plurality of pixels in apparent motion and the at least one of the second pixel classes corresponding to a foreground of the selected video segment thereby defining a final motion mask in the selected video segment indicative of the presence of a non-persistent object further comprises identifying at least one binary motion region from the at least one of the first pixel classes corresponding to a plurality of pixels in apparent motion, identifying at least one binary foreground region from the at least one of the second pixel classes corresponding to a foreground indicative of the presence of a non-persistent object, and defining the final motion mask based on at least one of: an absolute size of an overlapping region of the identified binary motion region and the identified binary foreground region; a fractional size of an overlapping region of the identified binary motion region and the identified binary foreground region; and a shape of an overlapping region of the identified binary motion region and the identified binary foreground region.

In an alternative embodiment, the method of combining the at least one of the first pixel classes corresponding to a plurality of pixels in apparent motion and the at least one of the second pixel classes corresponding to a foreground of the selected video segment thereby defining a final motion mask in the selected video segment indicative of the presence of a non-persistent object further comprises identifying at least one non-binary motion region from the at least one of said first pixel classes corresponding to a plurality of pixels in apparent motion, associated with the motion non-binary mask, deriving a first continuous-valued mask indicative of a pixel-wise confidence metric for each of the identified non-binary motion regions based on an associated first continuous-valued value for the non-binary motion region, identifying at least one non-binary foreground region from the at least one of the second pixel classes corresponding to a foreground associated with the foreground non-binary mask, deriving a second continuous-valued mask indicative of a pixel-wise confidence metric for each of the identified non-binary foreground regions based on an associated second continuous-valued value for said non-binary foreground region, and defining the final motion mask based on at least one of: an absolute size of an overlapping region of the identified non-binary motion region and the identified non-binary foreground region; a fractional size of an overlapping region of the identified non-binary motion region and the identified non-binary foreground region; and a shape of an overlapping region of the identified non-binary motion region and the identified non-binary foreground region.

In an alternative embodiment, a method for efficient motion detection of non-persistent objects comprises selecting a video segment for evaluation and evaluating the video segment to identify at least two first pixel classes wherein at least one of the first pixel classes corresponds to a plurality of stationary pixels and at least one of the first pixel classes corresponds to a plurality of pixels in apparent motion indicative of the presence of a non-persistent object in motion. The method further comprises identifying a plurality of candidate motion pixels corresponding to a plurality of pixels in apparent motion indicative of the presence of a non-persistent object in motion and applying morphological filtering to the candidate motion pixels thereby providing a motion mask. In addition, the method includes evaluating the video segment to identify at least two second pixel classes wherein at least one of the second pixel classes corresponds to a background and at least one of the second pixel classes corresponds to a foreground indicative of the presence of a non-persistent object. That method further comprises identifying a current frame of the selected video segment and identifying a current background frame of the selected video segment, comparing the current background frame of the selected video segment and the identified current frame of the video segment to identify a foreground of the current frame and producing a foreground mask. Then, the method comprises combining the at least one of said first pixel classes corresponding to a plurality of pixels in apparent motion and the at least one of the second pixel classes corresponding to a foreground, thereby defining a final motion mask in the selected video segment indicative of the presence of a non-persistent object and providing an output indicating an object in motion.

In addition, the first pixel class corresponds to a plurality of pixels in apparent motion and comprises one of a motion binary mask and a motion non-binary mask. The second pixel class corresponds to a foreground indicative of the presence of a non-persistent object and comprises one of a foreground binary mask and a foreground non-binary mask.

In an alternative embodiment, the method of combining the set of motion pixels indicative of the presence of an object in motion and the at least one of the pixel classes corresponding to a foreground of the selected video segment thereby defining a final motion mask in the selected video segment indicative of the presence of a non-persistent object further comprises one of applying a binary, pixel-wise AND operation on the motion binary mask and the foreground binary mask; or applying a binary, pixel-wise OR operation on the motion binary mask and the foreground binary mask.

The method of combining the at least one of the first pixel classes corresponding to a plurality of pixels in apparent motion and the at least one of the second pixel classes corresponding to a foreground of the selected video segment thereby defining a final motion mask in said selected video segment indicative of the presence of a non-persistent object further comprises applying a pixel-wise operation on the motion non-binary mask and the foreground non-binary mask comprising at least one of: averaging a continuous-value associated with the motion non-binary mask and a continuous-value associated with the foreground binary mask; computing a weighted average of a continuous-value associated with the motion non-binary mask and a continuous-value associated with the foreground binary mask computing a product of a continuous-value associated with said motion non-binary mask and a continuous-value associated with the foreground binary mask; and conducting an order-statistical combination of a continuous-value associated with the motion non-binary mask and a continuous-value associated with the foreground binary mask; and thereafter thresholding a resulting mask from the pixel-wise operation to yield the final motion mask.

In yet another alternative embodiment, a system for efficient motion detection of non-persistent objects comprises a camera configured to collect video data, a processor, and a computer-usable medium embodying computer code, the computer-usable medium being coupled to the processor, and the computer code comprising non-transitory instruction media executable by the processor configured for selecting a video segment for evaluation; evaluating the video segment to identify at least two first pixel classes wherein at least one of the first pixel classes corresponds to a plurality of stationary pixels and at least one of the first pixel classes corresponds to a plurality of pixels in apparent motion indicative of the presence of a non-persistent object in motion. The instruction media is executable by the processor and also configured for evaluating the video segment to identify at least two second pixel classes wherein at least one of the second pixel classes corresponds to a background and at least one of the second pixel classes corresponds to a foreground indicative of the presence of a non-persistent object, and combining the at least one of the first pixel classes corresponding to a plurality of pixels in apparent motion and the at least one of said second pixel classes corresponding to a foreground, thereby defining a final motion mask in the selected video segment indicative of the presence of a non-persistent object and providing an output indicating an object in motion.

In another embodiment, the first pixel class corresponds to a plurality of pixels in apparent motion and comprises one of a motion binary mask and a motion non-binary mask; and the second pixel class corresponds to a foreground indicative of the presence of a non-persistent object comprising one of a foreground binary mask and a foreground non-binary mask.

In addition, the system above includes combining the set of motion pixels indicative of the presence of an object in motion and the at least one of the pixel classes corresponding to a foreground of the selected video segment thereby defining a final motion mask in the selected video segment indicative of the presence of a non-persistent object further comprises one of applying a binary, pixel-wise AND operation on the motion binary mask and the foreground binary mask, or applying a binary, pixel-wise OR operation on the motion binary mask and the foreground binary mask.

In another embodiment, the system of combining said at least one of the first pixel classes corresponding to a plurality of pixels in apparent motion and the at least one of the second pixel classes corresponding to a foreground of the selected video segment thereby defining a final motion mask in the selected video segment indicative of the presence of a non-persistent object further comprises applying a pixel-wise operation on the motion non-binary mask and the foreground non-binary mask comprising at least one of: averaging a continuous-value associated with the motion non-binary mask and a continuous-value associated with the foreground binary mask; computing a weighted average of a continuous-value associated with the motion non-binary mask and a continuous-value associated with the foreground binary mask; computing a product of a continuous-value associated with the motion non-binary mask and a continuous-value associated with the foreground binary mask; and conducting an order-statistical combination of a continuous-value associated with the motion non-binary mask and a continuous-value associated with the foreground binary mask; and then thresholding a resulting mask from the pixel-wise operation to yield the final motion mask.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for efficient motion detection of non-persistent objects comprising: selecting a video segment for evaluation;
   evaluating said video segment to identify at least two first pixel classes wherein at least one of said first pixel classes corresponds to a plurality of stationary pixels and at least one of said first pixel classes corresponds to a plurality of pixels in apparent motion indicative of the presence of a non-persistent object in motion;
   evaluating said video segment to identify at least two second pixel classes wherein at least one of said second pixel classes corresponds to a background and at least one of said second pixel classes corresponds to a foreground indicative of the presence of a non-persistent object;
wherein evaluating said video segment to identify at least two first pixel classes wherein at least one of said first pixel classes corresponds to a plurality of stationary pixels and at least one of said first pixel classes corresponds to a plurality of pixels in apparent motion indicative of the presence of an object in motion further comprises: identifying a plurality of candidate motion pixels corresponding to a plurality of pixels in apparent motion indicative of the presence of a non-persistent object in motion; and applying morphological filtering to said candidate motion pixels thereby providing a motion mask;
   combining said at least one of said first pixel classes corresponding to a plurality of pixels in apparent motion and said at least one of said second pixel classes corresponding to a foreground, thereby defining a final motion mask in said selected video segment indicative of the presence of a non-persistent object; and providing an output indicating an object in motion.

2. The method of claim 1 wherein identifying a plurality of candidate motion pixels corresponding to a plurality of pixels in apparent motion indicative of the presence of an object in motion comprises at least one of: computing a frame-to-frame difference;
   computing a double frame-to-frame difference; computing a multiple frame-to-frame difference;
   computing an optical flow; and computing a block based motion estimation.

3. The method of claim 1 wherein applying morphological filtering to said candidate motion pixels further comprises: defining a refined set of motion pixels indicative of the presence of a non-persistent object in motion; and applying morphological hole filling on said refined set of motion pixels thereby providing a motion binary mask.

4. The method of claim 1 wherein evaluating said video segment to identify at least two second pixel classes wherein at least one of said second pixel classes corresponds to a background and at least one of said second pixel classes corresponds to a foreground indicative of the presence of a non-persistent object further comprises:
   identifying a current frame of said selected video segment and identifying a current background frame of said selected video segment;
   comparing said current background frame of said selected video segment and said identified current frame of said video segment to identify a foreground of said current frame; and
   producing a foreground mask.

5. The method of claim 4 wherein identifying a current background frame of said selected video segment comprises one of:
   estimating a current background frame of said video segment wherein estimating a current background frame comprises at least one of:
      performing a pixel-wise running average on a plurality of incoming frames;
      performing a pixel-wise weighted average on a plurality of incoming frames;
      performing a pixel-wise median computation on a plurality of incoming frames; and
   computing a set of pixel-wise statistical models corresponding to said current background frame.

6. The method of claim 4 wherein producing a foreground binary mask further comprises:
   applying morphological filtering on said identified foreground of said current frame; and comparing a size of said identified foreground of said current frame against a threshold size, wherein if said size of said identified foreground of said current frame is greater than said threshold size, said foreground of said current frame provides a foreground binary mask.

7. The method of claim 1 wherein said first pixel class corresponding to a plurality of pixels in apparent motion comprises one of a motion binary mask and a motion non-binary mask; and
wherein said second pixel class corresponding to a foreground indicative of the presence of a non-persistent object comprises one of a foreground binary mask and a foreground non-binary mask.

8. The method of claim 7 wherein combining said set of motion pixels indicative of the presence of an object in motion and said at least one of said pixel classes corresponding to a foreground of said selected video segment thereby defining a final motion mask in said selected video segment indicative of the presence of a non-persistent object further comprises one of:
applying a binary, pixel-wise AND operation on said motion binary mask and said foreground binary mask; and
applying a binary, pixel-wise OR operation on said motion binary mask and said foreground binary mask.

9. The method of claim 7 wherein combining said at least one of said first pixel classes corresponding to a plurality of pixels in apparent motion and said at least one of said second pixel classes corresponding to a foreground of said selected video segment thereby defining a final motion mask in said selected video segment indicative of the presence of a non-persistent object further comprises:
applying a pixel-wise operation on said motion non-binary mask and said foreground non-binary mask comprising at least one of:
averaging a continuous-value associated with said motion non-binary mask and a continuous-value associated with said foreground binary mask;
computing a weighted average of a continuous-value associated with said motion non-binary mask and a continuous-value associated with said foreground binary mask;
computing a product of a continuous-value associated with said motion non-binary mask and a continuous-value associated with said foreground binary mask;
conducting an order-statistical combination of a continuous-value associated with said motion non-binary mask and a continuous-value associated with said foreground binary mask; and
thresholding a resulting mask from said pixel-wise operation to yield said final motion mask.

10. The method of claim 1 wherein combining said at least one of said first pixel classes corresponding to a plurality of pixels in apparent motion and said at least one of said second pixel classes corresponding to a foreground of said selected video segment thereby defining a final motion mask in said selected video segment indicative of the presence of a non-persistent object, further comprises:
identifying at least one binary motion region from said at least one of said first pixel classes corresponding to a plurality of pixels in apparent motion;
identifying at least one binary foreground region from said at least one of said second pixel classes corresponding to a foreground indicative of the presence of a non-persistent object; and
defining said final motion mask based on at least one of:
an absolute size of an overlapping region of said identified binary motion region and said identified binary foreground region;
a fractional size of an overlapping region of said identified binary motion region and said identified binary foreground region; and
a shape of an overlapping region of said identified binary motion region and said identified binary foreground region.

11. The method of claim 7 wherein combining said at least one of said first pixel classes corresponding to a plurality of pixels in apparent motion and said at least one of said second pixel classes corresponding to a foreground of said selected video segment thereby defining a final motion mask in said selected video segment indicative of the presence of a non-persistent object further comprises:
identifying at least one non-binary motion region from said at least one of said first pixel classes corresponding to a plurality of pixels in apparent motion associated with said motion non-binary mask;
deriving a first continuous-valued mask indicative of a pixel-wise confidence metric for each of said identified non-binary motion regions based on an associated first continuous-valued value for said non-binary motion region;
identifying at least one non-binary foreground region from said at least one of said second pixel classes corresponding to a foreground associated with said foreground non-binary mask;
deriving a second continuous-valued mask indicative of a pixel-wise confidence metric for each of said identified non-binary foreground regions based on an associated second continuous-valued value for said non-binary foreground region; and
defining said final motion mask based on at least one of:
an absolute size of an overlapping region of said identified non-binary motion region and said identified non-binary foreground region;
a fractional size of an overlapping region of said identified non-binary motion region and said identified non-binary foreground region; and
a shape of an overlapping region of said identified non-binary motion region and said identified non-binary foreground region.

12. A method for efficient motion detection of non-persistent objects comprising:
selecting a video segment for evaluation;
evaluating said video segment to identify at least two first pixel classes wherein at least one of said first pixel classes corresponds to a plurality of stationary pixels and at least one of said first pixel classes corresponds to a plurality of pixels in apparent motion indicative of the presence of a non-persistent object in motion further comprising:
identifying a plurality of candidate motion pixels corresponding to a plurality of pixels in apparent motion indicative of the presence of a non-persistent object in motion; and
applying morphological filtering to said candidate motion pixels thereby providing a motion mask;
evaluating said video segment to identify at least two second pixel classes wherein at least one of said second pixel classes corresponds to a background and at least one of said second pixel classes corresponds to a foreground indicative of the presence of a non-persistent object further comprising:
identifying a current frame of said selected video segment and identifying a current background frame of said selected video segment;
comparing said current background frame of said selected video segment and said identified current frame of said video segment to identify a foreground of said current frame; and producing a foreground mask;
combining said at least one of said first pixel classes corresponding to a plurality of pixels in apparent motion and said at least one of said second pixel classes corresponding to a foreground, thereby defining a final motion mask in said selected video segment indicative of the presence of a non-persistent object; and
providing an output indicating an object in motion.

13. The method of claim 12 wherein said first pixel class corresponding to a plurality of pixels in apparent motion comprises one of a motion binary mask and a motion non-binary mask; and
wherein said second pixel class corresponding to a foreground indicative of the presence of a non-persistent object comprises one of a foreground binary mask and a foreground non-binary mask.

14. The method of claim 13 wherein combining said set of motion pixels indicative of the presence of an object in motion and said at least one of said pixel classes corresponding to a foreground of said selected video segment thereby defining a final motion mask in said selected video segment indicative of the presence of a non-persistent object further comprises one of:
applying a binary, pixel-wise AND operation on said motion binary mask and said foreground binary mask; and
applying a binary, pixel-wise OR operation on said motion binary mask and said foreground binary mask.

15. The method of claim 13 wherein combining said at least one of said first pixel classes corresponding to a plurality of pixels in apparent motion and said at least one of said second pixel classes corresponding to a foreground of said selected video segment thereby defining a final motion mask in said selected video segment indicative of the presence of a non-persistent object further comprises:
applying a pixel-wise operation on said motion non-binary mask and said foreground non-binary mask comprising at least one of:
averaging a continuous-value associated with said motion non-binary mask and a continuous-value associated with said foreground binary mask;
computing a weighted average of a continuous-value associated with said motion non-binary mask and a continuous-value associated with said foreground binary mask;
computing a product of a continuous-value associated with said motion non-binary mask and a continuous-value associated with said foreground binary mask;
conducting an order-statistical combination of a continuous-value associated with said motion non-binary mask and a continuous-value associated with said foreground binary mask; and
thresholding a resulting mask from said pixel-wise operation to yield said final motion mask.

16. A system for efficient motion detection of non-persistent objects comprising: a camera configured to collect video data; a processor; and a computer-usable medium embodying computer code, said computer-usable medium being coupled to said processor, said computer code comprising non-transitory instruction media executable by said processor configured for:
selecting a video segment for evaluation;
evaluating said video segment to identify at least two first pixel classes wherein at least one of said first pixel classes corresponds to a plurality of stationary pixels and at least one of said first pixel classes corresponds to a plurality of pixels in apparent motion indicative of the presence of a non-persistent object in motion; evaluating said video segment to identify at least two second pixel classes wherein at least one of said second pixel classes corresponds to a background and at least one of said second pixel classes corresponds to a foreground indicative of the presence of a non-persistent object; wherein said first pixel class corresponding to a plurality of pixels in apparent motion comprises one of a motion binary mask and a motion non-binary mask; and wherein said second pixel class corresponding to a foreground indicative of the presence of a non-persistent object comprises one of a foreground binary mask and a foreground non-binary mask; by applying morphological filtering combining said at least one of said first pixel classes corresponding to a plurality of pixels in apparent motion and said at least one of said second pixel classes corresponding to a foreground, thereby defining a final motion mask in said selected video segment indicative of the presence of a non-persistent object; and
providing an output indicating an object in motion.

17. The system of claim 16 wherein combining said set of motion pixels indicative of the presence of an object in motion and said at least one of said pixel classes corresponding to a foreground of said selected video segment thereby defining a final motion mask in said selected video segment indicative of the presence of a non-persistent object further comprises one of: applying a binary, pixel-wise AND operation on said motion binary mask and said foreground binary mask; and applying a binary, pixel-wise OR operation on said motion binary mask and said foreground binary mask.

18. The system of claim 16 wherein combining said at least one of said first pixel classes corresponding to a plurality of pixels in apparent motion and said at least one of said second pixel classes corresponding to a foreground of said selected video segment thereby defining a final motion mask in said selected video segment indicative of the presence of a non-persistent object further comprises:
applying a pixel-wise operation on said motion non-binary mask and said foreground non-binary mask comprising at least one of:
averaging a continuous-value associated with said motion non-binary mask and a continuous-value associated with said foreground binary mask;
computing a weighted average of a continuous-value associated with said motion non-binary mask and a continuous-value associated with said foreground binary mask;
computing a product of a continuous-value associated with said motion non-binary mask and a continuous-value associated with said foreground binary mask;
conducting an order-statistical combination of a continuous-value associated with said motion non-binary mask and a continuous-value associated with said foreground binary mask; and
thresholding a resulting mask from said pixel-wise operation to yield said final motion mask.

* * * * *